Oct. 12, 1965   J. ZOLTAI   3,211,355
SOLDER DISPENSER ATTACHMENT
Filed April 10, 1963   3 Sheets-Sheet 1
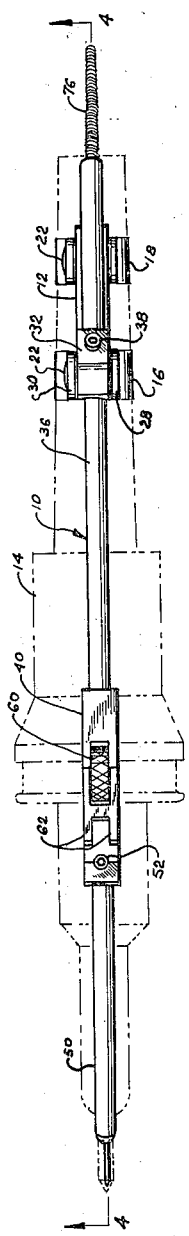
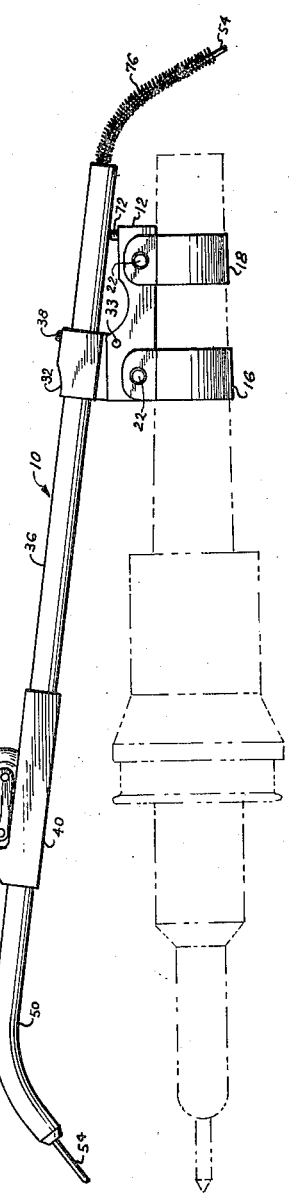
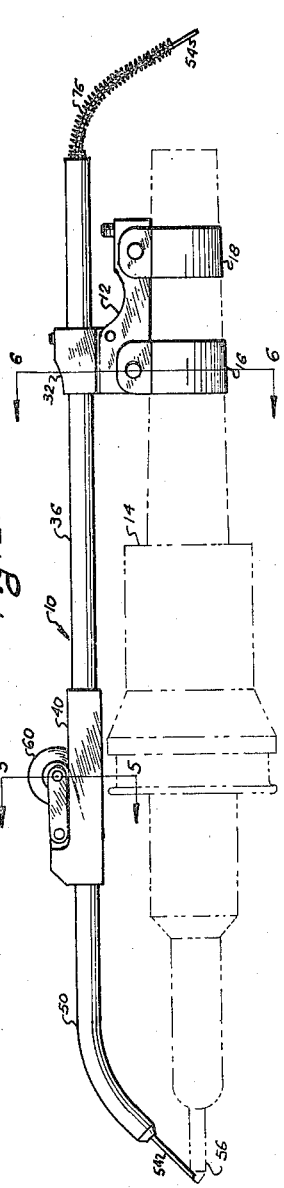
INVENTOR
John Zoltai
BY Lane d Aitken
ATTORNEY Oct. 12, 1965  J. ZOLTAI  3,211,355
SOLDER DISPENSER ATTACHMENT
Filed April 10, 1963  3 Sheets-Sheet 2
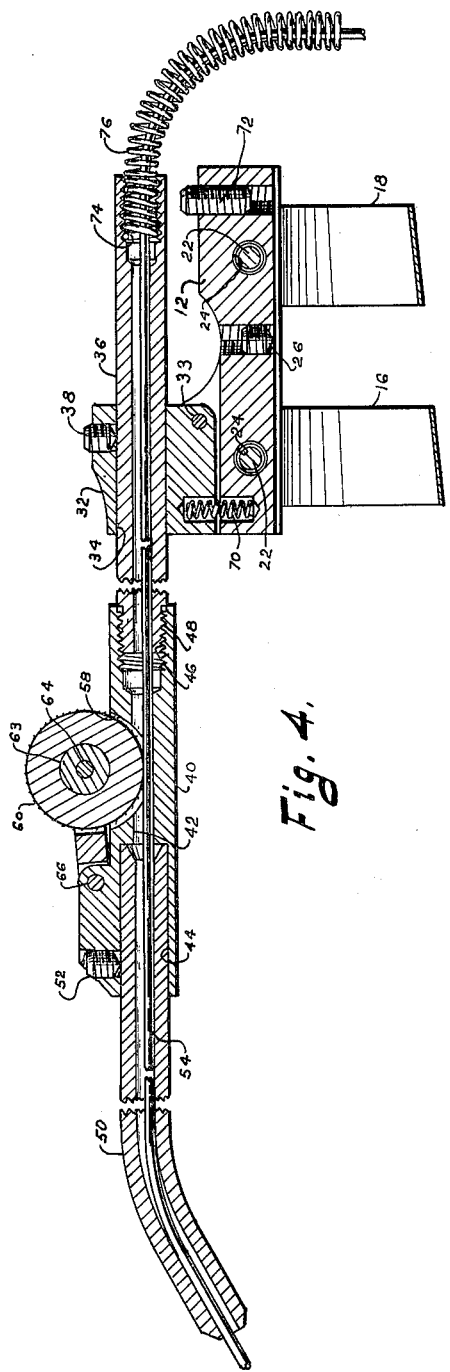
Fig. 4.
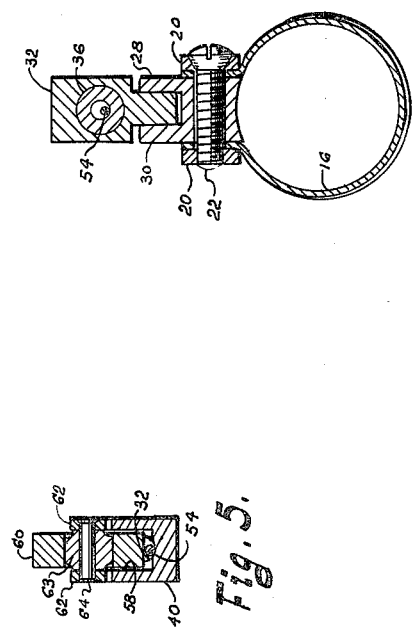
Fig. 6.
Fig. 5.
INVENTOR
John Zoltai
BY Lane & Aitken
ATTORNEY Oct. 12, 1965   J. ZOLTAI   3,211,355
SOLDER DISPENSER ATTACHMENT
Filed April 10, 1963   3 Sheets-Sheet 3
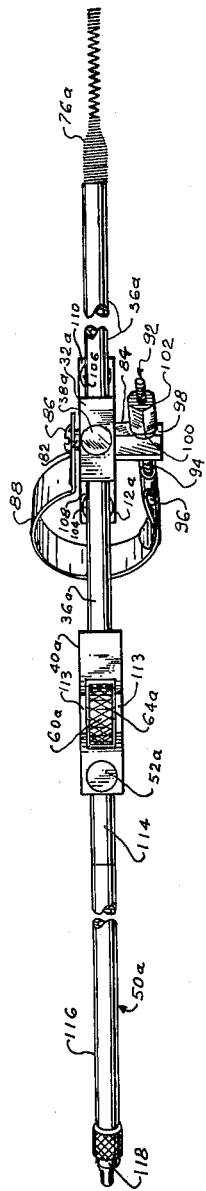
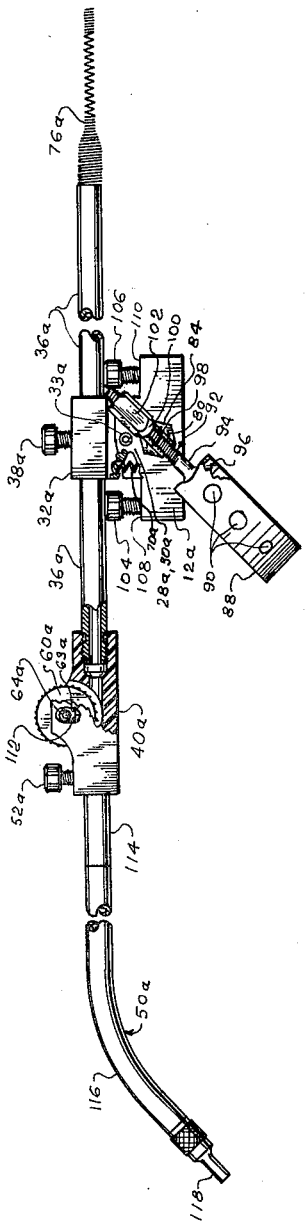
INVENTOR
John Zoltai
BY Lane, Aitken, Dunner & Ziems
ATTORNEYS United States Patent Office 3,211,355
Patented Oct. 12, 1965

3,211,355
SOLDER DISPENSER ATTACHMENT
John Zoltai, 100 Artist Road, Santa Fe, N. Mex.
Filed Apr. 10, 1963, Ser. No. 272,511
9 Claims. (Cl. 228—52)

This application is a continuation-in-part of my copending application, Serial No. 150,460, filed November 6, 1961, now abandoned.

This invention relates to solder dispenser attachments for dispensing solder wire to the heated tip of a soldering iron, and more particularly to a solder dispenser attachment that is pivoted away from the heated tip of the soldering iron when not in use to prevent melting of the solder flux in the dispenser.

In its preferred form, the present invention comprises a tubular solder dispenser attachment for receiving and guiding solder wire to the heated tip of a conventional soldering iron. A support is provided for clamping the attachment to the soldering iron in a manner to enable the end of the dispenser from which the soldering wire is dispensed to be pivoted toward and away from the heated tip of the soldering iron. An advancing mechanism is provided on the tubular dispenser for advancing the wire therethrough and is positioned for convenient actuation by the operator so that he can pivot the end of the tube into close proximity with the heated tip of the soldering iron and advance the soldering wire therefrom with the fingers of the hand holding the soldering iron, freeing the other hand for other use.

Accordingly, it is one object of the invention to provide a solder dispenser attachment that can be secured to a conventional soldering iron for easy operation by the same hand holding the soldering iron.

It is another object of the invention to prevent melting of solder flux in a solder dispenser adapted to be attached to a soldering iron to dispense solder to the heated tip thereof.

It is a further object of the invention to eliminate melting of solder flux and clogging in the dispensing end of a tube type solder dispenser by pivoting the dispensing end of the tube away from the heated tip of the soldering iron when the solder is not being dispensed.

It is a still further object of the invention to provide a pivoted solder dispenser attachment of the type described above which can be operated by the same hand holding the soldering iron so that when the operator wishes to place some solder on the heated tip of the soldering iron, a light finger pressure on a wheel of the solder dispenser attachment will pivot the dispensing end of the tube to the proper position, and a slight rotation of the wheel by the same finger will dispense the required amount of solder on the heated tip of the soldering iron, the solder dispenser automatically pivoting to its remote position when released by the finger.

It is a still further object of the invention to provide a solder dispenser attachment which can be operated by the same hand holding the soldering iron and normally assumes a position remote from the heated tip of the soldering iron so that the soldering iron can be used without any interference from the solder dispenser when disconnecting solder joints.

It is a still further object of the invention to provide a tightly wound helical spring that can be secured to the end of a solder dispenser attachment of the type described above to guide soldering wire therein in a manner to eliminate kinks in the soldering wire.

It is a still further object of the invention to provide a solder dispenser of the type referred to which is mountable on soldering irons of many different sizes and configurations and which is highly adjustable to facilitate accurate positioning of the solder relative to the heated tip of the soldering iron.

Other objects and features of novelty of the present invention will be specifically pointed out or will otherwise become apparent when referring, for a better understanding of the invention, to the following description taken in conjunction with the accompanying drawings, wherein:

FIG. 1 is a plan view of a solder dispenser attachment embodying features of the invention mounted on a conventional solding iron;

FIG. 2 is a side view of the construction illustrated in FIG. 1 with the solder dispenser in its normal position wherein the dispensing end thereof is pivoted away from the heated tip of the soldering iron;

FIG. 3 is a side view similar to that of FIG. 2 illustrating the position assumed by the solder dispenser when it is pivoted to its operating position for dispensing solder to the heated tip of the soldering iron;

FIG. 4 is an enlarged, broken, longitudinal sectional view taken on the line 4—4 of FIG. 1;

FIG. 5 is an enlarged cross-sectional view taken on the line 5—5 of FIG. 3;

FIG. 6 is an enlarged cross-sectional view taken on the line 6—6 of FIG. 3;

FIG. 7 is an enlarged fragmentary side view in partial cross-section of an alternative embodiment of the present invention; and FIG. 8 is fragmentary plan view of the embodiment illustrated in FIG. 7.

Referring to FIGS. 1–6 of the drawings, a solder dispenser attachment 10 embodying features of the invention is illustrated which is comprised of a support 12 secured to the end of a conventional soldering iron 14 in a suitable manner such as by clamps 16 and 18 having spacers 20 on the ends thereof secured to opposite sides of the support 12 by screws 22 extending through spaced holes 24 in the support. A set screw 26 may also be provided in the support between the spaced holes 24 in position to be tightened against the handle of the soldering iron 14 to eliminate possible slippage of the clamps 16 and 18.

A pair of lugs 28 and 30 project upwardly from the forward end of the support 12 and a pivot block 32 is pivotally supported therebetween on a pin 33 extending between the lugs. The pivot block 32 has a passageway 34 therethrough in which an adjusting tube 36 is slidably disposed, a set screw 38 being provided to releasably fix the adjusting tube in a selected axial position. A drive housing 40 having a passageway 42 extending longitudinally therethrough with enlarged counter bores 44 and 46 on the ends thereof is threadably connected to an externally threaded end portion 48 on the left end of the adjusting tube 36 with the passageway 42 aligned with the passageway through the adjusting tube 36, the enlarged counter bore 46 being internally threaded to accomplish this connection. The right end of a guide tube 50 is slidably disposed in the enlarged counter bore 44 and releasably secured therewithin by a set screw 52 on the forward end of the drive housing 40.

With this construction conventional solder wire 54 can be fed through the adjusting tube 36, passageway 42 in the drive housing, through the guide tube 50 and out the left end thereof in position to be delivered to the heated tip 56 of the soldering iron when the solder attachment dispenser 12 is pivoted to the position illustrated in FIG. 3, as will be described in greater detail hereinafter. In order to advance the solder wire through the solder dispenser, a slot 58 is provided in the center portion of the drive housing 40 which communicates the passageway 42 with the exterior of the housing. A drive wheel 60 having a bushing 63 fixed therein is rotatably journaled between a pair of arms 62 by a pin 64 and the arms, in turn, are pivotally connected to the upper front portion of the housing 40 by a pin 66 in a manner to enable the lower portion of the drive wheel to project through the slot 58 and rotatably engage the solder wire 54 in the passageway 42. The periphery of the drive wheel is preferably provided with a suitable friction surface so that it will effectively advance the solder wire 54 through the solder dispenser when rotated by the finger of an operator.

As stated in the outset of this application the dispensing end of the solder dispenser attachment is normally pivoted away from the heated tip of the soldering iron to the position illustrated in FIG. 2. This is preferably accomplished by a compression spring 70 interposed between the forward end of the pivot block 32 and the forward end of the support 12 as most clearly illustrated in FIG. 4. The angle through which the solder dispenser is pivoted by the compression spring is controlled by a set screw 72 projecting upwardly from the rear end of the support 12 in position to engage the right end of the adjusting tube 36 and act as an adjustable stop for limiting the clockwise pivotal movement of the solder dispenser.

With this construction an operator can hold the soldering iron 14 in his hand with the solder dispenser in its normal position as illustrated in FIG. 2, and freely use the soldering iron for disconnecting solder joints, or other purposes, without interference from the solder dispenser attachment. However, when the operator wants to solder, he need only lift his forefinger and exert a light pressure on the drive wheel 60 to pivot the solder dispenser to the position illustrated in FIG. 3, and then rotate the drive wheel slightly with the same finger to dispense the required amount of solder. When the required amount of solder has been dispensed, the operator need only lift his finger from the drive wheel 60 and the compression spring 70 will automatically pivot the dispenser to the position illustrated in FIG. 2 where the dispensing end of the guide tube 50 is far enough away from the heated tip 56 of the soldering iron to ensure that the flux in the solder will not melt to clog the end of the guide tube.

Since the right end of the guide tube 50 is slidably disposed in the enlarged counter bore 44 in the left end of the drive housing 40, the set screw 52 can be released to enabled the guide tube to be rotated or shifted axially relative to the housing to enable the dispensing end thereof to be accurately positioned relative to the heated tip 56 without changing the position of the drive housing 40 or the position of the support 12 on the handle of the soldering iron. By virtue of the threaded connection between the drive housing 40 and the left end of the adjusting tube 36, the drive housing itself can be rotated at any angle to suit individual requirements regarding the location of the drive wheel 60 and the set screw 38 can also be released to enable the axial position of the adjusting tube 36 to be varied to adjust the position of both the drive wheel 60 and the guide tube 50.

In accordance with an important feature of the invention, the right end of the adjusting tube 36 is provided with a suitable internally threaded portion 74 and the end of a helical guide spring 76 is threadably retained therein for guiding the solder wire 54 into the end of the adjusting tube. The helical spring 76 straightens out kinks in the solder before it enters the adjusting tube and eliminates the sharp entrance angle into the adjusting tube that would exist if the spring were not provided. It has been discovered that, if the helical guide spring 76 is made of the smallest possible diameter spring wire, and is closely wound like a tension spring on the smallest mandrel permissible, it is surprisingly effective in straightening out kinked solder wire. In actual tests conducted, the solder wire 54 was folded and refolded into a bundle and the wire from this bundle was fed into the adjusting tube 36 through the guide spring 76 which very effectively straightened out all of the kinks without trouble.

In the alternative embodiment shown in FIGS. 7 and 8, parts corresponding to the embodiment of FIGS. 1–6 are designated by the same reference numerals with the suffix, "a." Hence, it will be noted that in this instance the support 12a is provided with a central transverse bore 80 within which a pin 82 having an elongated hexagon-shaped head 84 is rotatably positioned. As shown in FIG. 8, the end of the pin 82 opposite from the head 84 is centrally bored and threaded to receive a retaining screw 86. The screw 86 also functions to secure one end of a clamping strap 88 against the end of the pin 82. It will be noted that the pin 82 is of a sufficient length that the screw 86 may be drawn tightly against the strap 88 without binding the strap against the sides of the support 12a or impeding rotation of the pin 82 within the bore 80 in any manner. The extending end of the strap 88 is provided with a plurality of spaced apertures 90 for receiving a T-bolt 92 having a threaded shank 94 and a cross head 96. The threaded shank 94 is adapted to be received in a slot 98 cut into the end of the hexagonal head 84 of the pin 82. The hexagonal head 84 is counter-sunk on one side thereof contiguous with the slot 98 to receive the rounded end 100 of a clamping nut 102.

As in the embodiment of FIGS. 1–6, the pivot block 32a is pivotally connected to the support 12a by the pin 33a extending through upstanding lugs 28a and 30a. Similarly, the adjusting tube 36a is received in a longitudinal bore within the pivot block 32a and fixed thereto by the set screw 38a. Also, the compression spring 70a is provided to bias the pivot block and the forward end of the adjusting tube away from the heated tip of the soldering iron to which the dispenser is adapted to be mounted. In this instance however, the pivot block 32a is centrally disposed on the support 12a and a pair of stop screws 104 and 106 are threadably received in shoulders 108 and 110 respectively on the support 12a. Thus, it will be apparent that by proper adjustment of the stop screws 104 and 106, pivotal movement of the pivot block 32a and the adjusting tube 36a may be accurately limited in both directions due to engagement of the adjusting tube 36a with the stop screws.

As in the preceding embodiment, the forward end of the adjusting tube 36a mounts the drive housing 40a, in turn mounting the drive wheel 60a. In this embodiment it is preferred that the drive housing 40a be molded from plastic material having a low coefficient of friction and which is relatively insensitive to heat. A plastic material suitable for this use is commercially sold under the trademark "Delrin," though other well known plastics having similar characteristics might be used. The low coefficient of friction of the plastic material reduces substantially the drag on the solder as it is moved through the drive housing by rotation of the drive wheel 60a. Also in this embodiment, the drive housing is merely provided with vertically disposed slots 112 in upstanding lugs 113 on each side of the wheel for receiving the pin 64a of the drive wheel. The guide tube 50a is secured to the drive housing by the set screw 52a as in the embodiment of FIGS. 1–6. In this embodiment, however, the guide tube is formed having repairable sections including a mounting section 114, a curved section 116 and a tip 118. The sections 114, 116 and tip 118 are threadably interconnected to facilitate changing curved tube sections of different lengths and configurations and as well, to provide tips of variable orifice sizes to accommodate different sizes of solder wire.

In operation, the embodiment of FIGS. 7 and 8 is the same as the preceding embodiment described above. To mount the alternative embodiment of FIGS. 7 and 8 to the soldering iron however, the T-bolt 92 is inserted through one of the apertures 90 selected to provide the appropriate length of strap to extend around the soldering iron. The extending end of the strap is then doubled back against the soldering iron, the shank 94 inserted in the slot 98 and the clamping nut 102 drawn up. Because of the rotation permitted between the pin 82 on which the strap is mounted as well as the extreme variation in diameter to which the strap 88 may be accommodated, the embodiment of FIGS. 7 and 8 is adapted to an extremely wide range of different soldering irons. Moreover, because of the stop screws 104 and 106, the tip 118 may be accurately positioned with respect to the heated tip of the soldering iron so that a minimum of movement is required in getting the tip 118 between a position of rest or non-use and a working position in close proximity to the heated tip of the soldering iron.

While it is apparent that the embodiments of the present invention described above are well calculated to fulfill the objects of the invention, it will be appreciated that many changes, revisions, and modifications can be made without departing from the spirit or scope of the invention as defined in the following claims.

What is claimed is:

1. A solder dispenser attachment comprising supporting means adapted to be secured to a soldering iron, an adjustable tube for receiving and guiding solder wire, a housing having a passageway therethrough connected to one end of said adjustable tube with said passageway aligned with said tube, a guide tube having one end thereof connected to said housing in position to enable solder wire to pass through the adjustable tube and said passageway into the guide tube and out the other end thereof, said housing having an opening in the wall thereof communicating with said passageway, an actuator mounted on said housing and extending though said opening in position to engage the solder wire in said passageway for advancing it out said other end of the guide tube, and means for pivotally mounting said adjustable tube on said support means for pivotal movement between a first and second position, said other end of the guide tube overlying the heated tip of the soldering iron when in said first position and being pivoted away from the heated tip in said second position.

2. The invention as defined in claim 1 wherein said last mentioned means includes means for adjusting the axial position of said adjustable tube relative to said support.

3. The invention as defined in claim 1 wherein said actuator comprises a friction drive wheel rotatably mounted on said housing with the periphery thereof extending through said slot in position to frictionally engage the solder wire passing through said passageway whereby the solder wire can be advanced by rotating the friction wheel.

4. A solder dispenser attachment comprising a support adapted to be secured to a soldering iron, a pivot block pivotally mounted on said support, an adjustable tube slidably mounted on said pivot block, means for releasably fixing said adjustable tube against sliding movement relative to said pivot block, a housing having a passageway therethrough mounted on one end of said adjustable tube with said passageway aligned with the tube, a guide tube mounted on said housing in alignment with said passageway to enable solder wire to pass through said adjustable tube and passageway into said guide tube and out the other end thereof, advancing means on said housing for advancing solder wire through the passageway therein, and spring means acting between said support and pivot block for normally resiliently biasing said other end of the guide tube from a first position wherein it closely overlies the heated tip of the soldering iron to a second position wherein it is pivoted away from the heated tip of the soldering iron.

5. The invention as defined in claim 4 including means for adjusting the axial position of said guide tube relative to said housing to vary the distance between said housing and said other end of the guide tube.

6. The invention as defined in claim 4 wherein said advancing means comprises an opening in the wall of said housing communicating with said passageway therethrough, and a friction wheel pivotally mounted on said housing with the periphery thereof extending through said opening in position to frictionally engage solder wire in said passageway so as to advance the solder wire when the wheel is rotated.

7. A solder dispenser attachment comprising a support adapted to be secured to a soldering iron, a pivot block pivotally mounted on said support, an adjustable tube slidably mounted on said pivot block, means on said pivot block for releasably fixing said adjustable tube against sliding movement relative thereto, a drive housing threadably mounted on one end of said adjustable tube and having a passageway extending therethrough aligned with the adjustable tube, guide tube having one end thereof slidably mounted on said housing in alignment with said passageway so as to enable soldering wire to pass through the adjustable tube and passageway into the guide tube and out the other end thereof, means on said housing for releasably fixing said guide tube in an adjusted axial position relative to said housing, said housing having an opening in the wall thereof communicating with said passageway therein, a friction drive wheel pivotally mounted on said housing and normally pivoted to a position wherein the periphery thereof projects through said opening in position to engage solder wire extending through said passageway so as to advance the solder wire when rotated, and spring means acting between said support and pivot block for normally resiliently biasing said pivot block from a first position wherein said other end of the guide tube closely overlies the heated tip of the soldering iron to a second position wherein said other end of the guide tube is pivoted away from the heated tip of the soldering wire.

8. A solder dispenser attachment comprising: a support; means for securing said support to the handle of the soldering iron including a pin extending through said support, said pin having a head at one end with an opening formed therein, a strap fixed to the end of said pin opposite from said one end, and means receivable in the opening in said head for tightening said strap about the handle of the soldering iron; a pivot block pivotally mounted on said support; tube means mounted on said pivot block for pivotal movement therewith between first and second positions; means to adjust the axial position of said tube means relative to said pivot block, one end of said tube means overlying the heated tip of the soldering iron in said first position and being pivoted away from the heated tip in said second position; spring means for resiliently biasing said tube means to said second position; and advancing means on said tube means between said one end and said pivot block for advancing solder wire through the tube means and out said one end thereof.

9. The invention as defined in claim 8 wherein said strap is formed having spaced apertures therein, and wherein said tightening means is a T-bolt receivable in any one of said apertures to vary the effective length of said strap.

References Cited by the Examiner

UNITED STATES PATENTS

| 1,631,063 | 5/27  | Rognley   | 113—109 |
| 1,871,009 | 8/32  | Righter   | 113—109 |
| 1,969,572 | 8/34  | Maurer    | 113—102 |
| 2,303,947 | 12/42 | Moore     | 113—109 |
| 2,433,514 | 12/47 | Hughey    | 113—109 |
| 2,643,321 | 6/53  | Greene    | 113—109 |
| 2,689,901 | 9/54  | Obolensky | 113—109 |
| 2,846,968 | 8/58  | Tipton    | 113—102 |

FOREIGN PATENTS

| 216,807 | 5/56 | Australia. |
| 463,141 | 3/37 | Great Britain. |

CHARLES W. LANHAM, *Primary Examiner.*

MARCUS U. LYONS, *Examiner.*